(12) United States Patent
Devarapalli et al.

(10) Patent No.: US 12,742,024 B2
(45) Date of Patent: Sep. 22, 2026

(54) BRANCHED POLYVINYL ALCOHOL AS A SHALE STABILIZER FOR DRILLING FLUID APPLICATIONS

(71) Applicant: Halliburton Energy Services, Inc., Houston, TX (US)

(72) Inventors: V. Ramireddy Devarapalli, Pune (IN); Sunita S. Kadam, Pune (IN); Rahul Patil, Pune (IN); William Cecil Pearl, Jr., Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 694 days.

(21) Appl. No.: 18/115,877

(22) Filed: Mar. 1, 2023

(65) Prior Publication Data

US 2024/0327553 A1 Oct. 3, 2024

(51) Int. Cl.

| | |
|---|---|
| ***C08F 8/14*** | (2006.01) |
| ***C08F 116/06*** | (2006.01) |
| ***C08K 3/30*** | (2006.01) |
| ***C08K 11/00*** | (2006.01) |

(52) U.S. Cl.

CPC .............. *C08F 116/06* (2013.01); *C08F 8/14* (2013.01); *C08K 3/30* (2013.01); *C08K 11/005* (2013.01); *C08K 2003/3045* (2013.01)

(58) Field of Classification Search

CPC ........................... C08F 116/06; C09K 2208/12

See application file for complete search history.

(56) References Cited

U.S. PATENT DOCUMENTS

| | | | |
|---|---|---|---|
| 3,872,018 A * | 3/1975 | Alexander | C10M 3/16 252/8.5 A |
| 4,447,341 A | 5/1984 | Block | |
| 10,774,260 B2 | 9/2020 | Deville et al. | |
| 11,008,504 B1 | 5/2021 | Pearl et al. | |
| 11,584,877 B2 | 2/2023 | Pearl, Jr. et al. | |
| 2007/0129258 A1 | 6/2007 | Patel et al. | |
| 2013/0112413 A1 | 5/2013 | Muthusamy et al. | |
| 2013/0292120 A1 | 11/2013 | Patil et al. | |
| 2014/0090842 A1 | 4/2014 | Patil et al. | |
| 2017/0137542 A1* | 5/2017 | Shaw | C08F 2/38 |
| 2017/0190946 A1 | 7/2017 | Pearl, Jr. et al. | |
| 2017/0204718 A1 | 7/2017 | Pearl Jr. et al. | |
| 2018/0201828 A1 | 7/2018 | Pravesh et al. | |
| 2019/0023972 A1 | 1/2019 | Lei et al. | |
| 2022/0081605 A1 | 3/2022 | Pearl, Jr. et al. | |
| 2022/0089936 A1 | 3/2022 | Pearl, Jr. et al. | |
| 2022/0259483 A1 | 8/2022 | Pearl, Jr. et al. | |

OTHER PUBLICATIONS

International Search Report and Written Opinion for International Patent Application No. PCT/US2023/076136 dated Jan. 25, 2024. PDF file. 9 pages.

Baudry et al., Facile Synthesis of Branched Poly(vinyl alcohol)s, Macromolecules 2006, 36, 16, 5230-5237, Jul. 2006.

* cited by examiner

*Primary Examiner* — Catherine S Branch
*Assistant Examiner* — Huihong Qiao
(74) *Attorney, Agent, or Firm* — Thomas Rooney; C. Tumey Law Group PLLC

(57) ABSTRACT

A method may include: introducing a water-based drilling fluid comprising an aqueous base fluid and a branched polyvinyl alcohol shale stabilizer into a drill string; extending a wellbore using the drill string through a subterranean formation comprising a shale; and allowing the branched polyvinyl alcohol shale stabilizer to interact with the shale to at least partially inhibit the shale.

20 Claims, 4 Drawing Sheets

BRANCHED POLYVINYL ALCOHOL AS A SHALE STABILIZER FOR DRILLING FLUID APPLICATIONS

BACKGROUND

During drilling of subterranean boreholes, various strata that include reactive shales may be encountered. The term "shale" may refer to materials that may "swell," or increase in volume, when exposed to water. Examples of these shales may include certain types of clays (e.g., bentonite). Reactive shales may be problematic during drilling operations because of, among other factors, their tendency to degrade when exposed to aqueous media such as aqueous-based drilling fluids. This degradation, of which swelling is one example, can result in undesirable drilling conditions and/or undesirable interference with the drilling fluid. For instance, the degradation of the shale may interfere with attempts to maintain the integrity of drilled cuttings traveling up the wellbore until such time as the cuttings can be removed by solids control equipment located at the surface. Further, reactive shales may disintegrate into extremely fine particles which are not easily removed from the drilling fluid and affect the rheology of the drilling fluid.

One technique used to counteract the propensity of aqueous drilling fluids to interact with reactive shales in a formation involves the use of certain additives in aqueous drilling fluids that may inhibit shale, e.g., additives that may demonstrate a propensity for reducing the tendency of shale to absorb water.

BRIEF DESCRIPTION OF THE DRAWINGS

These drawings illustrate certain aspects of some of the embodiments of the present disclosure and should not be used to limit or define the claims.

DETAILED DESCRIPTION

Figure 1:
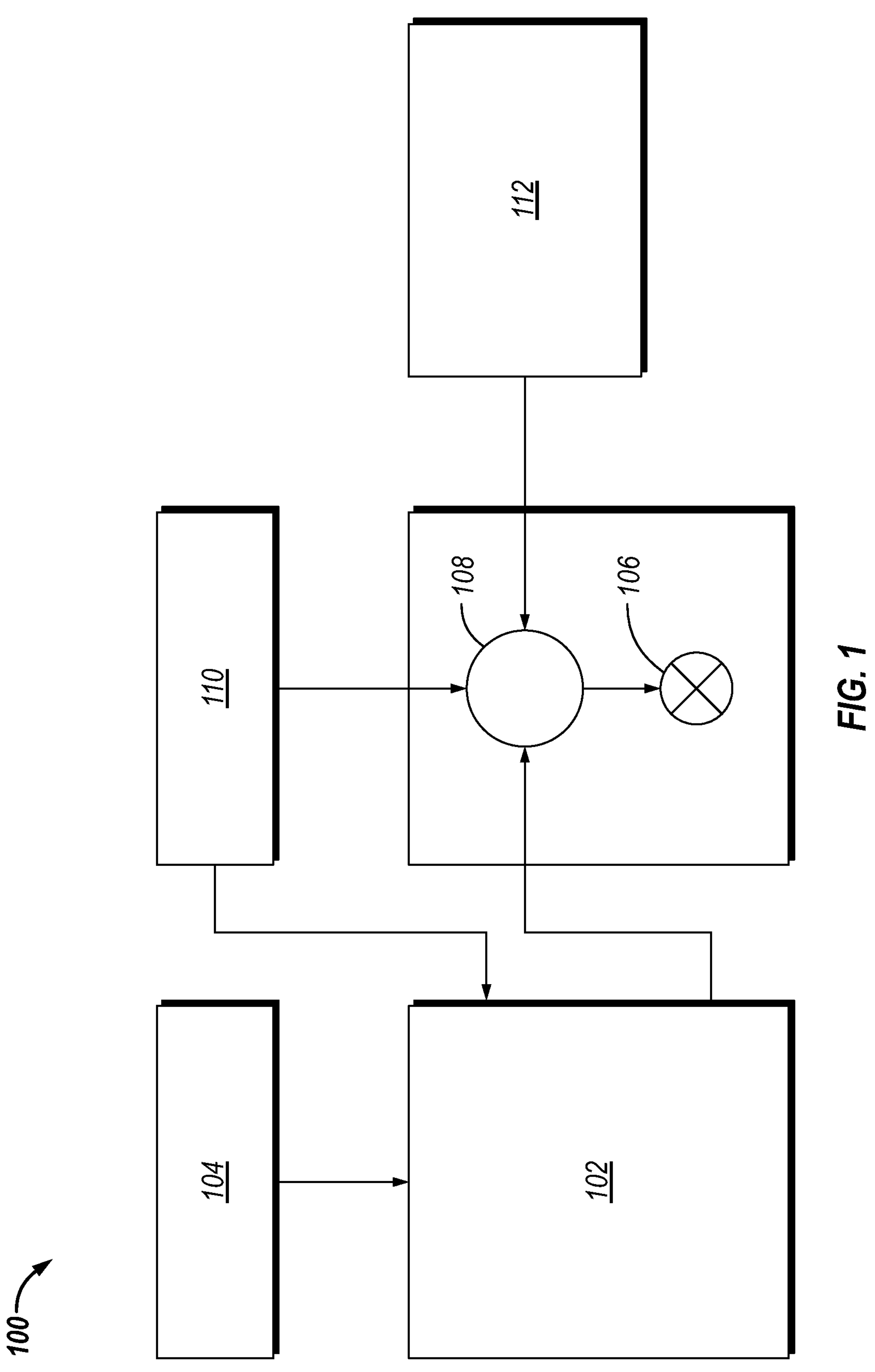
FIG. 1 is a diagram illustrating an example of a system that may be used in accordance with certain embodiments of the present disclosure.

The present disclosure relates to methods of drilling in a subterranean formations, and more particularly, to drilling in subterranean formations using water-based drilling fluids comprising an aqueous base fluid and a branched polyvinyl alcohol shale stabilizer.

Drilling in subterranean formations using a water-based drilling fluid has several challenges, including that shales present in the subterranean formation may interact with water from the drilling fluid. The shales may swell or disintegrate in the water which may cause operational problems with the drilling fluid. Shale stabilizers, such as liquid shale stabilizers, are oftentimes included in water-based drilling fluid to counteract swelling of the reactive shale (i.e. inhibit the shale). The shale stabilizer may inhibit the shale by any suitable mechanism, such as by encapsulation where the shale stabilizer adsorbs on the cuttings and/or other shale surfaces to at least partially counteract swelling of the shale. While liquid shale stabilizers are effective at counteracting shale swelling, liquid shale stabilizers may require several gallons per barrel of drilling fluid to be effective.

Among the many potential advantages to the methods and water-based drilling fluids comprising branched polyvinyl alcohol shale stabilizers of the present disclosure, only some of which are alluded to herein. The methods and compositions of the present disclosure may provide branched polyvinyl alcohol shale stabilizers can be handled as a dry powder. The branched polyvinyl alcohol shale stabilizer may be easier to handle than certain liquid shale inhibitor additives, which may require additional equipment (e.g., drums). In certain embodiments, the methods and compositions of the present disclosure may provide a branched polyvinyl alcohol shale stabilizer that has reduced shipping weight and/or cost, reduced volume and/or product footprint at the rig, reduced storage space, reduced packing cost, and reduced potential for liquid leaks as compared to certain liquid shale inhibitor additives. In certain embodiments, the methods and compositions of the present disclosure may provide a branched polyvinyl alcohol shale stabilizer that has a reduced water weight as compared to certain liquid shale inhibitor additives. In certain embodiments, the methods and compositions of the present disclosure may provide a branched polyvinyl alcohol shale stabilizer that is more potent weight for weight as compared to certain liquid shale inhibitor additives. In certain embodiments, the methods and compositions of the present disclosure may provide substantially or entirely salt-free branched polyvinyl alcohol shale stabilizers. In certain embodiments, the methods and compositions of the present disclosure may provide a branched polyvinyl alcohol shale stabilizer that is manufactured more sustainably than certain shale inhibitor additives.

In some embodiments, the branched polyvinyl alcohol shale stabilizer may be mixed as a solid additive with an aqueous base fluid to from a water-based drilling fluid. In some embodiments, the branched polyvinyl alcohol shale stabilizer may be a solid powder. In some embodiments, the branched polyvinyl alcohol shale stabilizer may be further incorporated into a multi-component dry powder blend (e.g., a dry mix composition) that may include other components such as a fluid loss material, lost circulation material, and other additional solid additives. The dry mix composition may be mixed with an aqueous base fluid to form a water-based drilling fluid.

The water-based drilling fluid the present disclosure may include an aqueous base fluid. The term "base fluid" refers to the major component of the fluid (as opposed to components dissolved and/or suspended therein), and does not indicate any particular condition or property of that fluid such as its mass, amount, pH, etc. Aqueous fluids that may be suitable for use in the methods and compositions of the present disclosure may include water from any source. Such aqueous fluids may include fresh water, salt water (e.g., water containing one or more salts dissolved therein), brine (e.g., saturated salt water), seawater, oil-in-water emulsions, or any combination thereof. The aqueous fluids may include one or more ionic species, such as those formed by salts dissolved in water. For example, seawater and/or produced water may include a variety of divalent cationic species dissolved therein. In embodiments where the base fluid includes an oil-in-water emulsion, the oil may include, but are not limited to a hydrocarbon, an organic liquid, a mineral oil, a synthetic oil, an ester, or any combination thereof. Examples of suitable non-aqueous fluids (e.g., oleaginous fluids) that may be included in the base fluid include, but are not limited to, α-olefins, internal olefins, alkanes, aromatic solvents, cycloalkanes, liquefied petroleum gas, kerosene, diesel oils, crude oils, gas oils, fuel oils, paraffin oils, mineral oils, low-toxicity mineral oils, olefins, esters, amides, synthetic oils (e.g., polyolefins), polydiorganosiloxanes, siloxanes, organosiloxanes, ethers, acetals, dialkylcarbonates, hydrocarbons, and combinations thereof.

In certain embodiments, the branched polyvinyl alcohol shale stabilizer of the present disclosure may be added to the water-based drilling fluid in an amount of from about 0.05% to about 50% by weight of the water-based drilling fluid (e.g., about 0.05%, 0.1%, about 1%, about 5%, about 10%, about 15%, about 20%, about 25%, about 30%, about 35%, about 40%, about 45%, about 50%, etc.). In some embodiments, the branched polyvinyl alcohol shale stabilizer may be added to the water-based drilling fluid in an amount of from about 1% to about 25% by weight of the water-based drilling fluid. Alternatively, the amount of branched polyvinyl alcohol shale stabilizer may be expressed by weight of dry solids. For example, the branched polyvinyl alcohol shale stabilizer may be added to the water-based drilling fluid in an amount of from about 0.1% to about 50% by weight of dry solids (e.g., about 0.1%, about 1%, about 2%, about 5%, about 10%, about 15%, about 20%, about 25%, about 30%, about 35%, about 40%, about 45%, about 50%, etc.). In some embodiments, the branched polyvinyl alcohol shale stabilizer may be added to the water-based drilling fluid in an amount of from about 0.1% to about 15% by weight of dry solids. In some embodiments, the branched polyvinyl alcohol shale stabilizer may be added to the water-based drilling fluid in an amount of from about 0.1 pound per barrel (ppb) to about 100 ppb (e.g., about 0.1 ppb, about 0.5 ppb, about 1 ppb, about 2 ppb, about 3 ppb, about 4 ppb, about 5 ppb, about 6 ppb, about 7 ppb, about 8 ppb, about 9 ppb, about 10 ppb, about 15 ppb, about 20 ppb, about 30 ppb, about 40 ppb, about 50 ppb, about 60 ppb, about 70 ppb, about 80 ppb, about 90 ppb, about 100 ppb, etc.). In some embodiments, the branched polyvinyl alcohol shale stabilizer may be added to the water-based drilling fluid in an amount of from about 0.5 ppb to about 20 ppb. In some embodiments, the branched polyvinyl alcohol shale stabilizer may be added to the water-based drilling fluid in an amount of from about 0.1 ppb to about 15 ppb. In some embodiments, at least a portion of the branched polyvinyl alcohol shale stabilizer may dissolve in the water-based drilling fluid.

In certain embodiments, the branched polyvinyl alcohol shale stabilizer may include particles of various sizes. In certain embodiments, the branched polyvinyl alcohol shale stabilizer may include particles having an average particle diameter ranging from about 0.1 micron to about 500 microns, from about 0.1 micron to about 400 microns, or from about 0.1 microns to about 300 microns. In certain embodiments, the branched polyvinyl alcohol shale stabilizer may include particles having a diameter of 500 microns or smaller, 400 microns or smaller, or 300 microns or smaller. In some embodiments, the branched polyvinyl alcohol shale stabilizer may include particles having a diameter of from about 0.1 micron to about 500 microns. In certain embodiments, the branched polyvinyl alcohol shale stabilizer may include particles that exhibit a particle size distribution between about 0.1 micron and about 2,000 microns. For example, in some embodiments, the branched polyvinyl alcohol shale stabilizer may include particles that have a median (d50) particle size distribution of from about 2.5 microns to about 1,000 microns. In certain embodiments, the branched polyvinyl alcohol shale stabilizer may include particles that exhibit a d50 particle size distribution of 1,000 microns or smaller, 750 microns or smaller, 500 microns or smaller, 250 microns or smaller, 100 microns or smaller, or 50 microns or smaller.

The branched polyvinyl alcohol shale stabilizer may be included in a water-based drilling fluid comprising an aqueous base fluid. In certain embodiments, the water-based drilling fluid may include one or more additional treatment additives in addition to the branched polyvinyl alcohol shale stabilizer. In certain embodiments, at least a portion of the branched polyvinyl alcohol shale stabilizer may dissolve in the water-based drilling fluid. In certain embodiments, the branched polyvinyl alcohol shale stabilizer may be a solid powder that at least partially dissolves upon contact with the aqueous portion of the water-based drilling fluid to produce a liquid shale inhibitor.

The branched polyvinyl alcohol shale stabilizer may be synthesized by any suitable method, including combining a monomer with a cross-linking agent having three or more active functional groups for polymerizing with the monomer to form a polymer. Branched polyvinyl alcohols are unique and distinct from linear polyvinyl alcohols. Linear polyvinyl alcohols are typically produced by polymerization of vinyl acetate by free radical methods to produce poly(vinyl acetate) which is then hydrolyzed or subjected to alcoholysis to yield a corresponding polyvinyl alcohol. Various grades of polyvinyl alcohol may be produced by this method by varying the degree of hydrolysis. An intrinsic property of the polyvinyl acetate produced by free radical polymerization is that the branching is very low with typically ~1 branch per 100 vinyl acetate segments. It is believed that the branching may be attributed to radical chain transfer reactions involving the pendant acetate methyl groups. However, when the polyvinyl acetate is hydrolyzed to form the corresponding polyvinyl alcohol, the acetate group branches present in the polyvinyl acetate are removed, leading to a polyvinyl alcohol with an essentially linear backbone architecture.

In contrast, when a vinyl ester based monomer such as vinyl acetate is used with a cross-linking agent having three or more active functional groups, the resultant polyvinyl acetate is branched or "star shaped." Reaction 1 shows a branched polyvinyl acetate produced from vinyl acetate and 1,3,5-Triallyl-1,3,5-triazine-2,4,6(1H,3H,5H)-trione. The branched polyvinyl acetate can be hydrolyzed to form the corresponding branched polyvinyl alcohol.

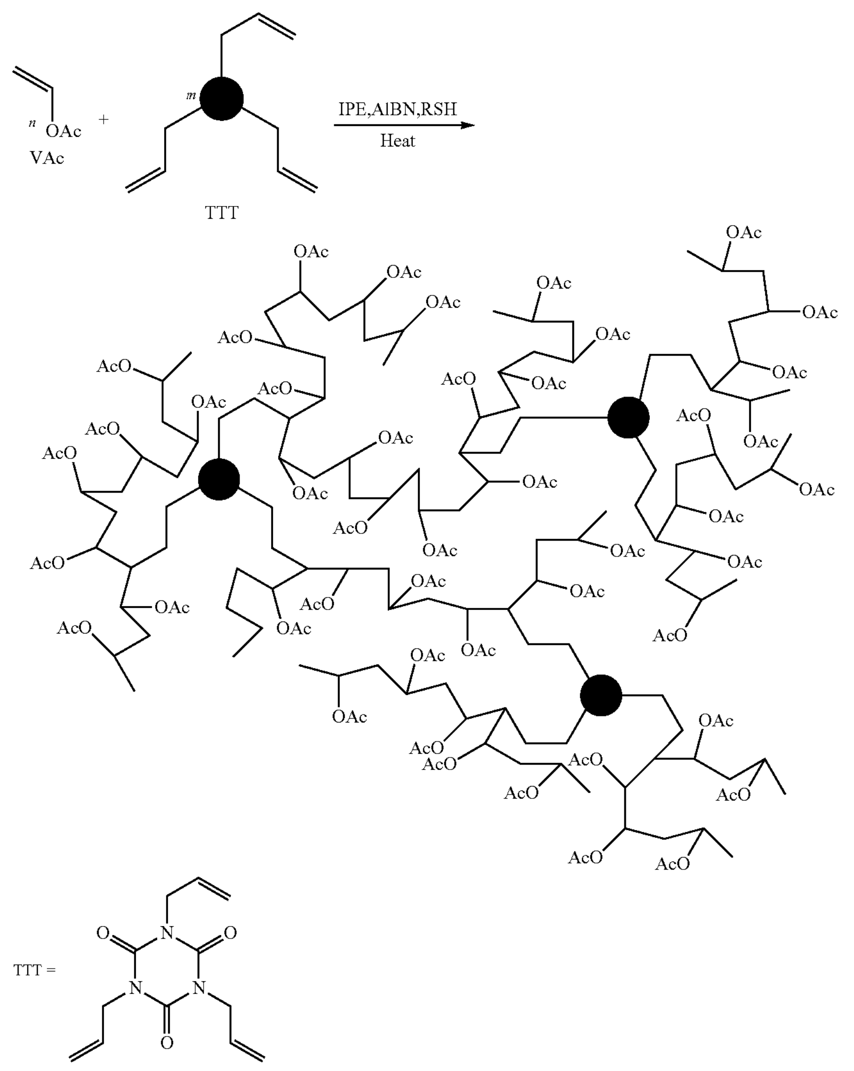

The branched polyvinyl alcohol may be prepared from any suitable vinyl ester monomer, including, but not limited vinyl acetate, vinyl propionate, vinyl propionate, vinyl valerate, vinyl caprate, vinyl laurate, vinyl stearate, vinyl benzoate, vinyl pivalate, and mixtures thereof. The monomer may be polymerized with a cross-linking agent which has at least three active functional groups for polymerizing with the monomer. The cross-linking agent can also have four, five, etc. active functional groups such that each branching point can form a minimum of three bonds with pendant functional groups of the monomer to create a branched polymer network. The cross-linking agent can be any compound having three or more active functional groups that bond with pendant functional groups of the monomer to cross-link and polymerize the monomer to form the polymer network. Examples of a cross-linking agent having three active functional groups may include, but not limited to, propanediol divinyl ether, triallyl ethers, triallyl phosphate, triallyl isocyanurate (TTT), pentaerythritol triacrylate, 1,1,1-trimethylolpropane triacrylate, 1,1,1-trimethylolpropane trimethacrylate, dipentaerythritol pentaacrylate, pentaerythritol tetraacrylate, and triallyl cyanurate. Examples of a cross-linking agent having four active functional groups may include, but not limited to, butanediol divinyl ether, tetraallyl pentaerythritol, tetraallyl orthosilicate, N~1~,N~1~,N~2~,N~2~-Tetraallyl-N'~1~,N'~2~-bis(4-methylphenyl)ethanediimidamide, tetraallyl 1,2,3,4-cyclopentanetetracarboxylate, tetraallylsilane, tetraallyl pyromellitate, pentaerythritol tetraallyl ether, and N,N,N',N'-tetraallyl-2,6-pyridinedicarboxamide. Examples of a cross-linking agent having five active functional groups may include, but not limited to, 1,2,3,5,5-Pentaallyl-1,3-cyclopentadiene, poly(allyl glycidyl ether)-b-poly(ethylene oxide)-b-poly(allyl glycidyl ether), poly(allyl glycidyl ether)-stat-poly(alkyl glycidyl ether)-block-poly(ethylene glycol)-block-poly(allyl glycidyl ether)-stat-poly(alkyl glycidyl ether).

The branched polymer network created via a variety of polymerization reactions, for example, free radical copolymerization of a vinyl acetate monomer, solvents, and the cross-linking agent. The total number of branching points in the polymer network can be adjusted by adjusting the concentration of the cross-linking agent and/or the polymerization conditions. By way of example, increasing the concentration of the cross-linking agent can increase the total number of branching points and vice versa. The greater the number of total branching points, the greater degree of branching that occurs and yields a larger polymer network. The amount of branching can be determined based on the specific conditions of the wellbore and desired properties of the cement composition. By way of example, increased branching can create a larger polymer network, which can affect the particle size of the fluid loss additive in addition to potentially increasing the viscosity of the cement composition. According to any of the embodiments, the mole ratio of the cross-linking agent to monomer can be in the range of 0.005:100 to 10:100.

After the branched polymer network is produced, the branched polymer network may be subjected to alcoholysis, hydrolysis, or any other suitable reaction to transform the pendant chains of the branched polymer network to —OH groups to form a branched polyvinyl alcohol.

The viscosity average degree of polymerization of the polymer can be 1,000 to 10,000, or 1,500 to 6,000, or 2,000 to 5,000. The "viscosity average degree of polymerization" (P) is a value calculated using Eq. 1 from the intrinsic viscosity [η] (g/dL) measured at 30° C. with an Ostwald viscometer using ion-exchanged water as a solvent.

$$\log(P) = 1.613 \times \log([\eta] \times 104/8.29) \quad \text{(Eq. 1)}$$

In some embodiments, the vinyl ester monomer may be copolymerized with one or more additional monomers, including, but not limited to α-olefin monomers such as ethylene and propylene; methyl (meth)acrylate, (meth) acrylic acid alkyl ester monomers such as ethyl acidate, butyl (meth)acrylate, and 2-ethylhexyl (meth)acrylate; unsaturated amide monomers such as (meth)acrylamide and N-methylolacrylamide; unsaturated carboxylic acid monomers such as (meth)acrylic acid, crotonic acid, maleic acid, itaconic acid, fumaric acid; alkyl(methyl, ethyl, propyl, etc.) ester monomers of unsaturated carboxylic acids; unsaturated carboxylic acid anhydrides; salts of unsaturated carboxylic acids with sodium, potassium, ammonium, etc.; glycidyl group-containing monomers such as allyl glycidyl ether, glycidyl (meth)acrylate; 2-acrylamido-2-methylpropane sulfone including sulfonic acid group-containing monomers such as acids or salts thereof; phosphoric acid group-containing monomers such as acid phosphooxyethyl methacrylate and acid phosphooxypropyl methacrylate; and alkyl vinyl ether monomer.

The water-based drilling fluid of the present disclosure may include one or more treatment additives. Examples of treatment additives suitable for certain embodiments of the present disclosure include, but are not limited to a viscosifier, a wetting agent, a thinner, a rheology modifier, an emulsifier, a surfactant, a dispersant, an interfacial tension reducer, a pH buffer, a mutual solvent, a lubricant, a defoamer, a cleaning agent, and any combination thereof.

In some embodiments, the water-based drilling fluid may include one or more salts including, but not limited to KCl, potassium acetate, NaCl, $CaCl_2$), NaBr, $CaBr_2$ and any combination thereof. In some embodiments, the water-based drilling fluid may include one or more salts in liquid form (e.g., dissolved in a fluid). In certain embodiments, the salt may include an anion selected from the group consisting of chloride, bromide, fluoride, an acetate, a formate, a silicate, and any combination thereof. In some embodiments, the salt may include a cation selected from the group consisting of potassium, sodium, magnesium, calcium, aluminum, barium, cesium, and any combination thereof. For example, in certain embodiments, a salt may be dissolved in a fluid to form a solution and mixed with the branched polyvinyl alcohol shale stabilizer to form a water-based drilling fluid. In some embodiments, the water-based drilling fluid may include one or more starches in liquid form.

In certain embodiments, the water-based drilling fluid may include an additional solvent. Examples of additional solvents suitable for certain embodiments of the present disclosure include, but are not limited to an alcohol, a glycol, polyethylene glycol, acetone, and any combination thereof. In some embodiments, the additional solvent may include water.

The treatment additives may be present in the water-based drilling fluid in an amount in a range of from about 0.1% to about 99% by weight, from about 0.1 to about 50% by weight, from about 10 to about 80% by weight, or from about 30 to about 70% by weight, all by weight of the water-based drilling fluid. In some embodiments, treatment additives may be present in the water-based drilling fluid in amount of 0.1%, 1%, 5%, 10%, 20%, 30%, 40%, 50%, 60%, 70%, 80%, or 90% by weight or higher, all by weight of the water-based drilling fluid.

In certain embodiments, the water-based drilling fluids of the present disclosure may include lost circulation materials or bridging agents. Examples of lost circulation materials or bridging agents suitable for certain embodiments of the present disclosure include, but are not limited to ground marble, resilient graphitic carbon, walnut shells, calcium carbonate, magnesium carbonate, limestone, dolomite, iron carbonate, iron oxide, calcium oxide, magnesium oxide, perborate salts, and the like, and any combination thereof. In certain embodiments, lost circulation materials or bridging agents may include, but are not limited to, ground marble, resilient graphitic carbon, ground walnut shells, sized salt water, calcium carbonate, polymers, and combinations thereof.

In some embodiments, the water-based drilling fluids of the present disclosure optionally may include a weighting agent. Examples of suitable weighting agents include, but are not limited to barite, hematite, calcium carbonate, magnesium carbonate, iron carbonate, zinc carbonate, manganese tetraoxide, ilmenite, and any combination thereof. These weighting agents may be at least partially soluble or insoluble in the water-based drilling fluid. In some embodiments, a weighting agent may be present in the water-based drilling fluid in an amount of from about 1% to about 60% by weight of the water-based drilling fluid (e.g., about 1%, about 5%, about 10%, about 15%, about 20%, about 25%, about 30%, about 35%, about 40%, about 45%, about 50%, about 55%, etc.). In some embodiments, the weighting agent may be present in the water-based drilling fluid in an amount of from about 1% to about 35% by weight of the water-based drilling fluid. In some embodiments, the weighting agent may be present in the water-based drilling fluid in an amount of from about 1% to about 10% by weight of the water-based drilling fluid. Alternatively, the amount of weighting agent may be expressed by weight of dry solids. For example, the weighting agent may be present in an amount of from about 1% to about 99% by weight of dry solids (e.g., about 1%, about 5%, about 10%, about 20%, about 30%, about 40%, about 50%, about 60%, about 70%, about 80%, about 90%, about 99%, etc.). In some embodiments, the weighting agent may be present in an amount of from about 1% to about 20% and, alternatively, from about 1% to about 10% by weight of dry solids.

The branched polyvinyl alcohol shale stabilizer of the present disclosure may be provided as a "dry mix" to be combined with a base fluid and/or other components prior to or during introducing the water-based drilling fluid into the subterranean formation. Certain other components of the water-based drilling fluid may also be provided as a dry mix. A dry mix composition may include two or more dry mix components. In some embodiments, a dry mix or dry mix composition may be designed to be mixed with a base fluid in an amount from about 1 to about 20 gallons per 94-lb sack of dry mix or dry mix composition (gal/sk). In certain embodiments, the dry mix or dry mix composition may be suitable for use with base fluids in the amount of 10 gal/sk. In some embodiments, the dry mix or dry mix composition may be suitable for use with base fluids in the amount of 13.5 gal/sk. Embodiments of the water-based drilling fluids of the present invention may be prepared in accordance with any suitable technique. In some embodiments, the desired quantity of water may be introduced into a mixer followed by the dry mix or dry mix composition. For example, the dry mix composition may include a lost circulation material and additional solid additives. Additional liquid additives, if any, may be added to the base fluid as desired prior to, or after, combination with the dry mix or dry mix composition. This mixture may be agitated for a sufficient period of time to form a slurry. It will be appreciated by those of ordinary skill in the art, with the benefit of this disclosure, that other suitable techniques for preparing water-based drilling fluids may be used in accordance with embodiments of the present invention.

In certain embodiments, the water-based drilling fluids and branched polyvinyl alcohol shale stabilizers of the present disclosure may be effective over a range of PH levels. For example, in certain embodiments, the branched polyvinyl alcohol shale stabilizer of the present disclosure may provide effective shale inhibition from a pH of about 7 to about 12. Additionally, the water-based drilling fluids of the present disclosure may be suitable for a variety of subterranean formations, including, but not limited to shale formations and carbonate formations.

In certain embodiments, the methods and compositions of the present disclosure optionally may include any number of additional additives. Examples of such additional additives include, but are not limited to, salts, surfactants, acids, proppant particulates, diverting agents, gas, nitrogen, carbon dioxide, surface modifying agents, tackifying agents, foamers, corrosion inhibitors, scale inhibitors, catalysts, clay control agents, biocides, friction reducers, antifoam agents, flocculants, additional shale inhibitors, fluid loss control additives, loss circulation materials, $H_2S$ scavengers, $CO_2$ scavengers, oxygen scavengers, lubricants, viscosifiers, breakers, relative permeability modifiers, resins, wetting agents, coating enhancement agents, filter cake removal agents, antifreeze agents (e.g., ethylene glycol), cross-linking agents, curing agents, gel time moderating agents, curing activators, and the like. In some embodiments, the water-based drilling fluid may contain rheology (viscosity and gel strength) modifiers and stabilizers. In certain embodiments, the additional additive may be a solid additive. In certain embodiments, the additional additive may be a solid additive that dissolves in an aqueous fluid (e.g., an aqueous liquid). A person skilled in the art, with the benefit of this disclosure, will recognize the types of additives that may be included in the fluids of the present disclosure for a particular application.

The methods and compositions of the present disclosure may be used in a variety of drilling applications including on shore and offshore vertical and horizontal boreholes. In certain embodiments, a water-based drilling fluid may be introduced into a subterranean formation. In some embodiments, the water-based drilling fluid may be introduced into a wellbore that penetrates a subterranean formation. In certain embodiments, a wellbore may be drilled and the water-based drilling fluid may be circulated in the wellbore during, before, or after the drilling. In some embodiments, the water-based drilling fluid may be introduced at a pressure sufficient to create or enhance one or more fractures within the subterranean formation (e.g., hydraulic fracturing).

The methods and compositions of the present disclosure may directly or indirectly affect one or more components or pieces of equipment associated with the preparation, delivery, recapture, recycling, reuse, and/or disposal of the compositions of the present disclosure. For example, the methods and compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the compositions of the present disclosure. The methods and compositions of the present disclosure may also directly or indirectly affect any transport or delivery equipment used to convey the fluid to a well site or downhole such as, e.g., any transport vessels, conduits, pipelines, trucks, tubulars, and/or pipes used to compositionally move fluids from one location to another, any pumps, compressors, or motors (e.g., topside or downhole) used to drive the fluids into motion, any valves or related joints used to regulate the pressure or flow rate of the fluids, and any sensors (i.e., pressure and temperature), gauges, and/or combinations thereof, and the like.

With reference to FIG. 1, the disclosed methods may directly or indirectly affect one or more components or pieces of equipment associated with a system 100, according to one or more embodiments. In certain embodiments, the system 100 includes a fluid producing apparatus 102, a fluid source 110, a branched polyvinyl alcohol shale stabilizer source 112, and a pump and blender system 108 and resides at the surface at a well site where a well 106 is located. The fluid can be a fluid for ready use in a treatment of the well 106. In other embodiments, the fluid producing apparatus 102 may be omitted and the fluid sourced directly from the fluid source 110.

The branched polyvinyl alcohol shale stabilizer source 112 may include at least one branched polyvinyl alcohol shale stabilizer for combination with a base fluid. The system 100 may also include additive source 104 that provides one or more additives to alter the properties of the fluid. For example, the other additives 104 can be included to reduce pumping friction, to reduce or eliminate the fluid's reaction to the geological formation in which the well is formed, to operate as surfactants, and/or to serve other functions.

The pump and blender system 108 may receive the fluid and combine it with other components, including the branched polyvinyl alcohol shale stabilizer source 112 and/or additional components from the additives source 104. In certain instances, the fluid producing apparatus 102, fluid source 110, and/or branched polyvinyl alcohol shale stabilizer source 112 may be equipped with one or more metering devices or sensors to control and/or measure the flow of fluids, branched polyvinyl alcohol shale stabilizers, bridging agents, and/or other compositions to the pumping and blender system 108. In certain embodiments, the metering devices may permit the pumping and blender system 108 to source from one, some, or all of the different sources at a given time, and may facilitate the preparation of fluids in accordance with the present disclosure using continuous mixing or "on-the-fly" methods. Thus, for example, the pumping and blender system 108 can provide just fluid into the well at certain times, just additives at other times, and combinations of those components at yet other times.

While not specifically illustrated herein, the disclosed methods and systems may also directly or indirectly affect any transport or delivery equipment used to convey wellbore compositions to the system 100 such as, e.g., any transport vessels, conduits, pipelines, trucks, tubulars, and/or pipes used to fluidically move compositions from one location to another, any pumps, compressors, or motors used to drive the compositions into motion, any valves or related joints used to regulate the pressure or flow rate of the compositions, and any sensors (e.g., pressure and temperature), gauges, and/or combinations thereof, and the like.

Figure 2:
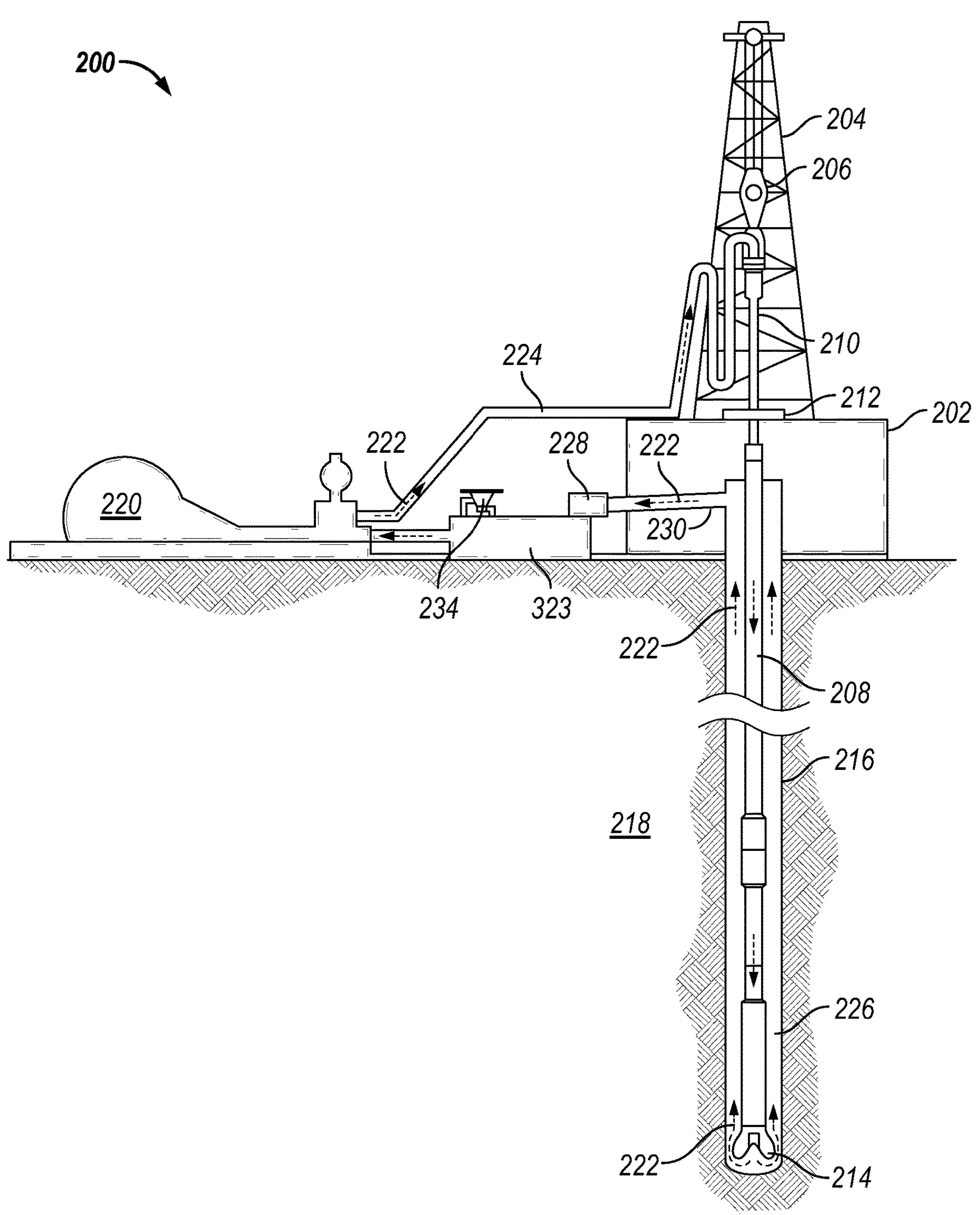
FIG. 2 is a diagram illustrating an example of a wellbore drilling assembly that may be used in accordance with certain embodiments of the present disclosure.

With reference to FIG. 2, the branched polyvinyl alcohol shale stabilizers of the present disclosure may directly or indirectly affect one or more components or pieces of equipment associated with an exemplary wellbore drilling assembly 200, according to one or more embodiments. It should be noted that while FIG. 2 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 200 may include a drilling platform 204 that supports a derrick 204 having a traveling block 206 for raising and lowering a drill string 208. The drill string 208 may include, but is not limited to, drill pipe and coiled tubing, as generally known to those skilled in the art. A kelly 210 supports the drill string 208 as it is lowered through a rotary table 212. A drill bit 214 is attached to the distal end of the drill string 208 and is driven either by a downhole motor and/or via rotation of the drill string 108 from the well surface. As the bit 214 rotates, it creates a wellbore 216 that penetrates various subterranean formations 218.

A pump 220 (e.g., a mud pump) circulates wellbore drilling fluid 222 (e.g., a water-based drilling fluid described herein) through a feed pipe 224 and to the kelly 210, which conveys the wellbore drilling fluid 222 downhole through the interior of the drill string 208 and through one or more orifices in the drill bit 214 (or optionally through a bypass or ports along the drill string and above the drill bit 214). The wellbore fluid 222 is then circulated back to the surface via an annulus 226 defined between the drill string 208 and the walls of the wellbore 216. At the surface, the recirculated or spent wellbore fluid 222 exits the annulus 226 and may be conveyed to one or more fluid processing unit(s) 228 via an interconnecting flow line 230. After passing through the fluid processing unit(s) 228, a "cleaned" wellbore fluid 222 is deposited into a nearby retention pit 232 (e.g., a mud pit). While illustrated as being arranged at the outlet of the wellbore 216 via the annulus 226, those skilled in the art will readily appreciate that the fluid processing unit(s) 228 may be arranged at any other location in the drilling assembly 200 to facilitate its proper function, without departing from the scope of the scope of the disclosure. The branched polyvinyl alcohol shale stabilizer of the present disclosure may be added to the wellbore fluid 222 via a mixing hopper 234 communicably coupled to or otherwise in fluid communication with the retention pit 232. The mixing hopper 234 may include, but is not limited to, mixers and related mixing equipment known to those skilled in the art. In other embodiments, however, the branched polyvinyl alcohol shale stabilizer of the present disclosure may be added to the wellbore fluid 222 at any other location in the drilling assembly 200. In at least one embodiment, for example, there could be more than one retention pit 232, such as multiple retention pits 232 in series. Moreover, the retention pit 232 may be representative of one or more fluid storage facilities and/or units where the branched polyvinyl alcohol shale stabilizers of the present disclosure may be stored, reconditioned, and/or regulated until added to the wellbore fluid 222.

As mentioned above, the branched polyvinyl alcohol shale stabilizers of the present disclosure may directly or indirectly affect the components and equipment of the drilling assembly 200. For example, the branched polyvinyl alcohol shale stabilizers of the present disclosure may directly or indirectly affect the fluid processing unit(s) 228 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. The fluid processing unit(s) 228 may further include one or more sensors, gauges, pumps, compressors, and the like used store, monitor, regulate, and/or recondition solid additives and/or lost circulation materials.

The branched polyvinyl alcohol shale stabilizers of the present disclosure may directly or indirectly affect the pump 220, which representatively includes any conduits, pipelines, trucks, tubulars, and/or pipes used to fluidically convey the water-based drilling fluids downhole, any pumps, compressors, or motors (e.g., topside or downhole) used to drive the water-based drilling fluids into motion, any valves or related joints used to regulate the pressure or flow rate of the branched polyvinyl alcohol shale stabilizer, and any sensors (i.e., pressure, temperature, flow rate, etc.), gauges, and/or combinations thereof, and the like. The branched polyvinyl alcohol shale stabilizer of the present disclosure may also directly or indirectly affect the mixing hopper 234 and the retention pit 232 and their assorted variations.

The branched polyvinyl alcohol shale stabilizers of the present disclosure may also directly or indirectly affect the various downhole equipment and tools that may come into contact with the branched polyvinyl alcohol shale stabilizer such as, but not limited to, the drill string 208, any floats, drill collars, mud motors, downhole motors and/or pumps associated with the drill string 208, and any MWD/LWD tools and related telemetry equipment, sensors or distributed sensors associated with the drill string 208. The branched polyvinyl alcohol shale stabilizer of the present disclosure may also directly or indirectly affect any downhole heat exchangers, valves and corresponding actuation devices, tool seals, packers and other wellbore isolation devices or components, and the like associated with the wellbore 216. The branched polyvinyl alcohol shale stabilizers of the present disclosure may also directly or indirectly affect the drill bit 214, which may include, but is not limited to roller cone bits, PDC bits, natural diamond bits, any hole openers, reamers, coring bits, etc.

The following statements may describe certain embodiments of the disclosure but should be read to be limiting to any particular embodiment.

Statement 1. A method comprising: introducing a water-based drilling fluid comprising an aqueous base fluid and a branched polyvinyl alcohol shale stabilizer into a drill string; extending a wellbore using the drill string through a subterranean formation comprising a shale;

and allowing the branched polyvinyl alcohol shale stabilizer to interact with the shale to at least partially inhibit the shale.

Statement 2. The method of statement 1, wherein the aqueous base fluid comprises at least one fluid selected from the group consisting of fresh water, salt water, brine, seawater, and combinations thereof.

Statement 3. The method of any of statements 1-2, wherein the branched polyvinyl alcohol comprises a hydrolyzed reaction product of a polymer network having at least one branching point formed with a monomer and a cross-linking agent that comprises at least three active functional groups.

Statement 4. The method of statement 3, wherein a mole ratio of the cross-linking agent to the monomer is in a range of 0.005:100 to 10:100.

Statement 5. The method of statement 3, wherein the monomer comprises a vinyl ester-based monomer.

Statement 6. The method of statement 5, wherein the vinyl ester-based monomer comprises at least one monomer selected from the group consisting of vinyl acetate, vinyl propionate, vinyl propionate, vinyl valerate, vinyl caprate, vinyl laurate, vinyl stearate, vinyl benzoate, vinyl pivalate, and combinations thereof.

Statement 7. The method of statement 5, wherein the polymer network further comprises a second monomer that is co-polymerized with the vinyl ester-based monomer, and wherein the second monomer comprises at least one monomer selected the group consisting of α-olefin monomers, methyl (meth)acrylate, (meth) acrylic acid alkyl ester monomers, unsaturated amide monomers, unsaturated carboxylic acid monomers, alkyl ester monomers of unsaturated carboxylic acids, unsaturated carboxylic acid anhydrides, salts of unsaturated carboxylic acids, glycidyl group-containing monomers, 2-acrylamido-2-methylpropane sulfone including sulfonic acid group-containing monomers, phosphoric acid group-containing monomers, alkyl vinyl ether monomers, and combinations thereof.

Statement 8. The method of any of statements 1-7, wherein the cross-linking agent comprises at least one agent selected from the group consisting of propanediol divinyl ether, triallyl ethers, triallyl phosphate, triallyl isocyanurate (TTT), pentaerythritol triacrylate, 1,1,1-trimethylolpropane triacrylate, 1,1,1-trimethylolpropane trimethacrylate, dipentaerythritol pentaacrylate, pentaerythritol tetraacrylate, triallyl cyanurate, butanediol divinyl ether, tetraallyl pentaerythritol, tetraallyl orthosilicate, N~1~,N~1~,N~2~,N~2~-Tetraallyl-N'~1~,N'~2~-bis(4-methylphenyl)ethanediimidamide, tetraallyl 1,2,3,4-cyclopentanetetracarboxylate, tetraallylsilane, tetraallyl pyromellitate, pentaerythritol tetraallyl ether, N,N,N',N'-tetraallyl-2,6-pyridinedicarboxamide, 1,2,3,5,5-Pentaallyl-1,3-cyclopentadiene, poly(allyl glycidyl ether)-b-poly(ethylene oxide)-b-poly(allyl glycidyl ether), poly(allyl glycidyl ether)-stat-poly(alkyl glycidyl ether)-block-poly(ethylene glycol)-block-poly(allyl glycidyl ether)-stat-poly(alkyl glycidyl ether).

Statement 9. The method of any of statements 1-8, wherein the branched polyvinyl alcohol comprises a hydrolyzed reaction product of vinyl acetate and triallyl isocyanurate.

Statement 10. The method of any of statements 1-9, further comprising preparing the water-based drilling fluid by combining the aqueous base fluid and the branched polyvinyl alcohol shale stabilizer, wherein the branched polyvinyl alcohol shale stabilizer is provided as a solid powder.

Statement 11. The method of any of statements 1-10, wherein the branched polyvinyl alcohol is present in the water-based drilling fluid in an amount of about 0.1 pounds per barrel (ppb) (0.29 $kg/m^3$) to about 10 ppb (28.5 $kg/m^3$).

Statement 12. A method comprising: combining a branched polyvinyl alcohol shale stabilizer with an aqueous base fluid to produce a water-based drilling fluid, wherein the branched polyvinyl alcohol shale stabilizer is a solid powder, and wherein the branched polyvinyl alcohol shale stabilizer is present in the water-based drilling fluid in an amount of about 0.1 pounds per barrel (ppb) (0.29 $kg/m^3$) to about 10 ppb (28.5 $kg/m^3$); introducing the water-based drilling fluid comprising the aqueous base fluid and the branched polyvinyl alcohol shale stabilizer into a drill string; extending a wellbore using the drill string through a subterranean formation comprising a shale; and allowing the branched polyvinyl alcohol shale stabilizer to interact with the shale to inhibit the shale at least partially.

Statement 13. The method of statement 12, wherein the aqueous base fluid comprises at least one fluid selected from the group consisting of fresh water, salt water, brine, seawater, and combinations thereof.

Statement 14. The method of any of statements 12-13, wherein the branched polyvinyl alcohol shale stabilizer comprises a hydrolyzed reaction product of a polymer network having at least one branching point formed with a monomer and a cross-linking agent that comprises at least three active functional groups.

Statement 15. The method of any of statements 12-14, wherein the monomer comprises a vinyl ester-based monomer.

Statement 16. The method of statement 15, wherein the vinyl ester-based monomer comprises at least one monomer selected from the group consisting of vinyl acetate, vinyl propionate, vinyl propionate, vinyl valerate, vinyl caprate, vinyl laurate, vinyl stearate, vinyl benzoate, vinyl pivalate, and combinations thereof.

Statement 17. The method of any of statements 12-16, wherein the cross-linking agent comprises at least one agent selected from the group consisting of propanediol divinyl ether, triallyl ethers, triallyl phosphate, triallyl isocyanurate (TTT), pentaerythritol triacrylate, 1,1,1-trimethylolpropane triacrylate, 1,1,1-trimethylolpropane trimethacrylate, dipentaerythritol pentaacrylate, pentaerythritol tetraacrylate, triallyl cyanurate, butanediol divinyl ether, tetraallyl pentaerythritol, tetraallyl orthosilicate, N~1~,N~1~,N~2~,N~2~-Tetraallyl-N'~1~,N'~2~-bis(4-methylphenyl)ethanediimidamide, tetraallyl 1,2,3,4-cyclopentanetetracarboxylate, tetraallylsilane, tetraallyl pyromellitate, pentaerythritol tetraallyl ether, N,N,N',N'-tetraallyl-2,6-pyridinedicarboxamide, 1,2,3,5,5-Pentaallyl-1,3-cyclopentadiene, poly(allyl glycidyl ether)-b-poly(ethylene oxide)-b-poly(allyl glycidyl ether), poly(allyl glycidyl ether)-stat-poly(alkyl glycidyl ether)-block-poly(ethylene glycol)-block-poly(allyl glycidyl ether)-stat-poly(alkyl glycidyl ether).

Statement 18. The method of any of statements 12-17, wherein the branched polyvinyl alcohol shale stabilizer comprises a hydrolyzed reaction product of vinyl acetate and triallyl isocyanurate.

Statement 19. The method of statement 18, wherein a mole ratio of the triallyl isocyanurate to vinyl acetate is in a range of 0.005:100 to 10:100.

Statement 20. A water-based drilling fluid comprising: a aqueous base fluid comprising a salt; a branched polyvinyl alcohol, wherein the branched polyvinyl alcohol is a solid powder, and wherein the branched polyvinyl alcohol is present in the water-based drilling fluid in an amount of about 0.1 pounds per barrel (ppb) (0.29 $kg/m^3$) to about 10 ppb (28.5 $kg/m^3$); and a weighting agent.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

In these examples, shale erosion and shale accretion test were performed according to API Recommended Practice 131, ninth edition, published December 2020, to determine the performance of branched PVA as compared to conventional shale stabilizers.

Example 1

Figure 3:
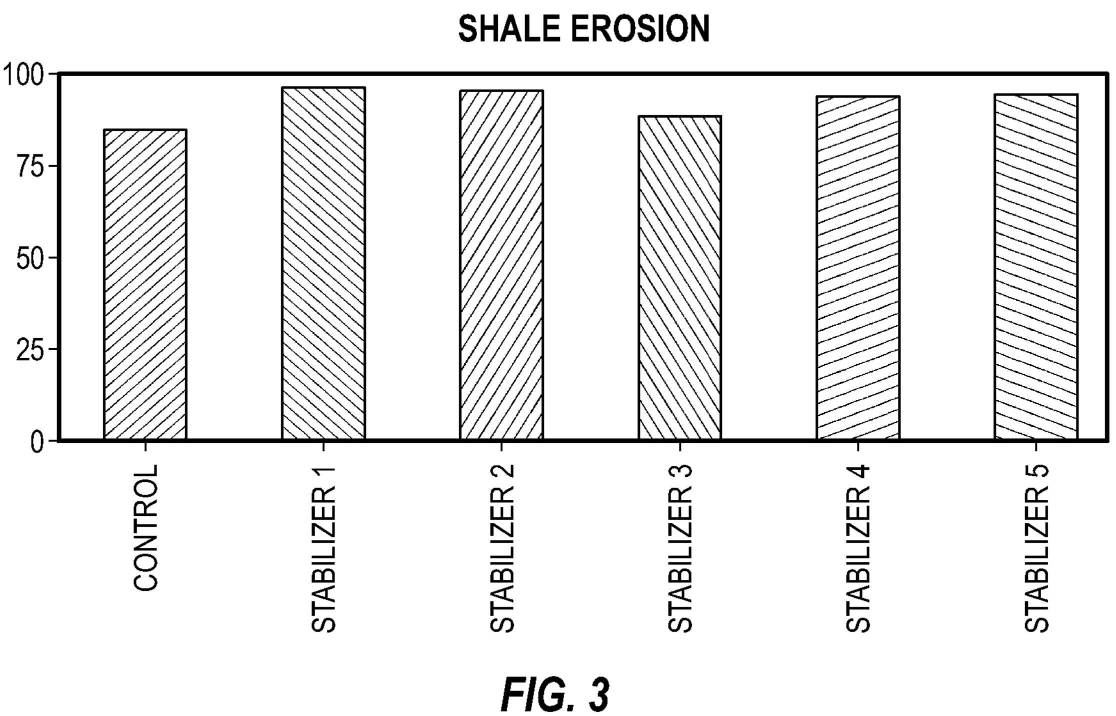
FIG. 3 is a bar graph of the results of a shale erosion test in accordance with certain embodiments of the present disclosure.
Figure 4:
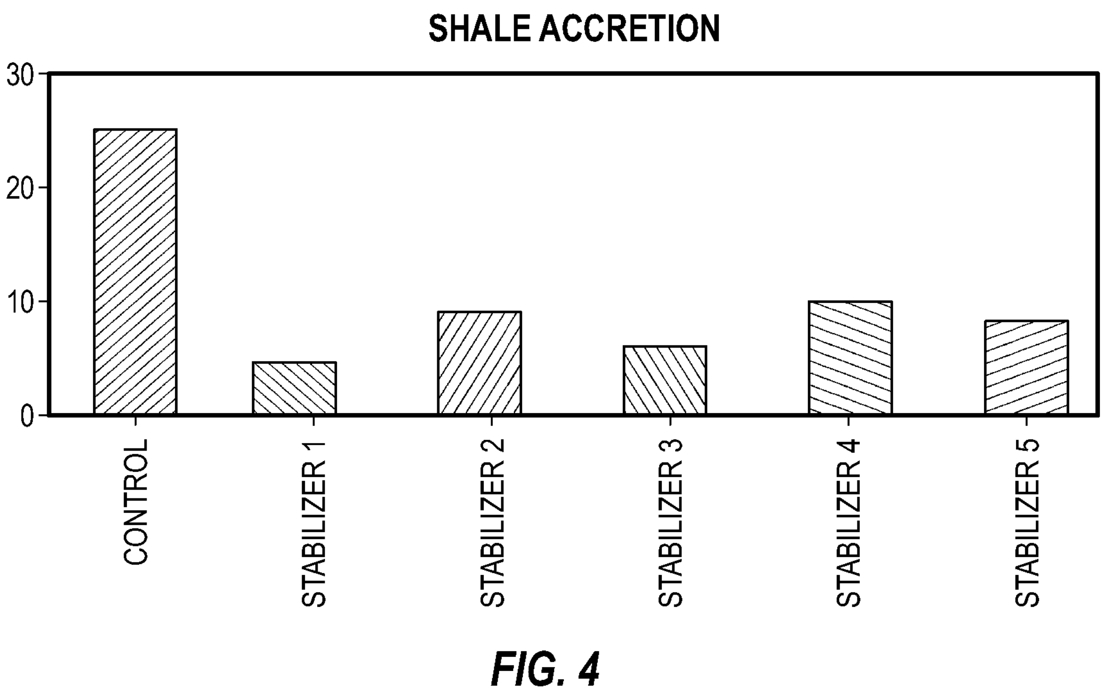
FIG. 4 is a bar graph of the results of a shale accretion test in accordance with certain embodiments of the present disclosure.

Several drilling fluid samples were prepared to 11 ppg (1318.09 $kg/m^3$) using 3 wt. % KCl using the formulation shown in table 1. The amount and type of shale stabilizer was varied in the samples and the physical properties of each sample including plastic viscosity and yield point are shown in Table 2. The fluid rheological properties of each sample were adjusted to achieve similar yield point values by changing the concentration of the xanthan gum. The drilling fluid samples were subjected to shale erosion and accretion tests, the results of which are shown in Table 2. FIG. 3 is a bar graph of the results of the shale erosion test and FIG. 4 is a bar graph of the results of the shale accretion test. It was observed that the drilling fluid sample containing branched PVA at 1 ppb concentration was greater than 95% effective at shale retention and has less than 10% shale accretion on the standard clays tested. Shale stabilization performance of the branched PVA was equal to or better than the other tested shale stabilizer even when the other tested shale stabilizer used at higher concentrations than the branched PVA.

TABLE 1

| |
|---|
| Fresh water |
| KCl (3 wt %) |
| Caustic Soda |
| Soda Ash |
| Xanthan |
| Starch Based Fluid Loss Additive |
| Shale Inhibitor |
| Barite |

TABLE 2

| | W/O Shale Stabilizer | Stabilizer 1 | Stabilizer 2 | Stabilizer 3 | Stabilizer 4 | Branched PVA |
|---|---|---|---|---|---|---|
| Concentration in Fluid, ppb | — | 10 | 1 | 3.5 | 2 | 1 |
| Plastic Viscosity, cP | 10 | 13 | 14 | 9 | 12 | 12 |
| Yield Point, lb/1000 ft^2 | 34 | 30 | 29 | 26 | 27 | 25 |
| Shale Retention, % | 85.23 | 96.83 | 96.17 | 89.3 | 94.67 | 95.1 |
| Shale Accretion, % | 25.07 | 4.53 | 8.97 | 6.03 | 10.07 | 8.33 |

Example 2

Figure 5:
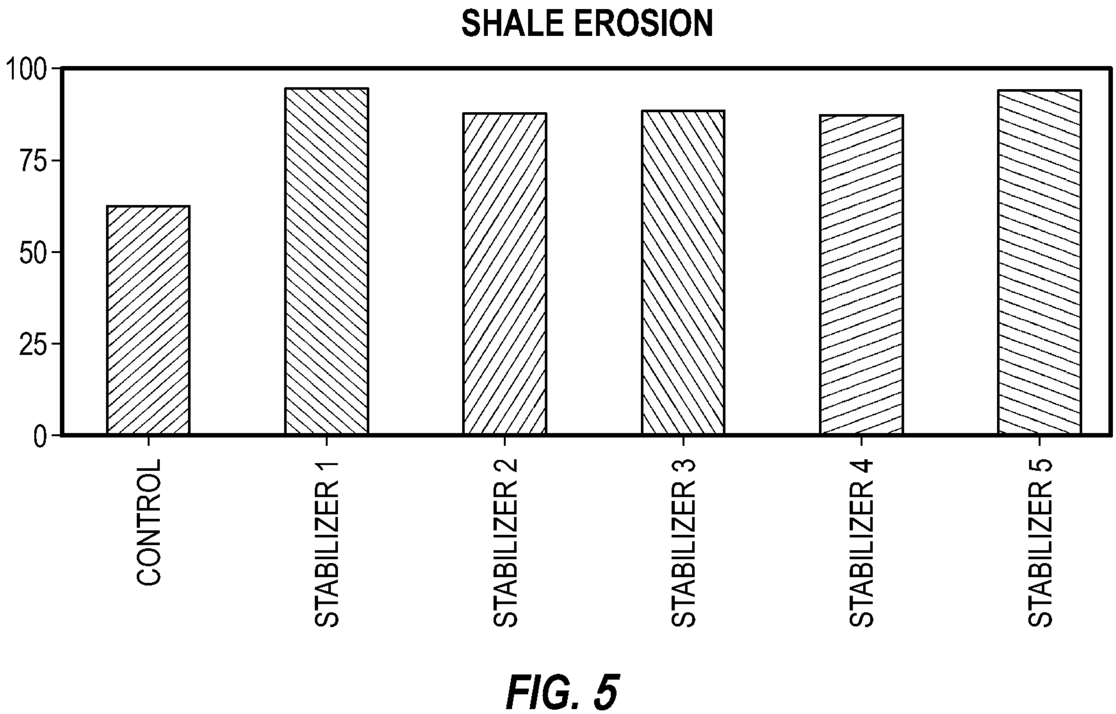
FIG. 5 is a bar graph of the results of a shale erosion test in accordance with certain embodiments of the present disclosure.

Several drilling fluid samples were prepared to 11 ppg (1318.09 $kg/m^3$) using fresh water using the formulation shown in table 3. The amount and type of shale stabilizer was varied in the samples and the physical properties of each sample including plastic viscosity and yield point are shown in Table 4. The drilling fluid samples were subjected to shale erosion tests, the results of which are shown in Table 4. FIG. 5 is a bar graph of the results of the shale erosion test. It was observed that the drilling fluid sample containing branched PVA at 1 ppb concentration was greater than 90% effective at shale stabilization in fresh water and the shale inhibitive performance of the branched PVA was equal to or better than the other tested shale stabilizer even when the other tested shale stabilizer used at higher concentrations than the branched PVA.

TABLE 3

| |
|---|
| Fresh water |
| Caustic Soda |
| Soda Ash |
| Xanthan |
| Starch Based Fluid Loss Additive |
| Shale Inhibitor |
| Barite |

TABLE 4

| | W/O Shale Stabilizer | Stabilizer 1 | Stabilizer 2 | Stabilizer 3 | Stabilizer 4 | Branched PVA |
|---|---|---|---|---|---|---|
| Conc. In Fluid, ppb | — | 10 | 1 | 3.5 | 2 | 1 |
| Plastic Viscosity, cP | 8 | 12 | 15 | 9 | 11 | 8 |

TABLE 4-continued

| | W/O Shale Stabilizer | Stabilizer 1 | Stabilizer 2 | Stabilizer 3 | Stabilizer 4 | Branched PVA |
|---|---|---|---|---|---|---|
| *Yield Point, lb/1000 ft^2 | 29 | 26 | 53 | 35 | 37 | 40 |
| Shale Retention, % | 62.63 | 94.27 | 87.63 | 88.07 | 87.67 | 93.77 |

Example 3

Figure 6:
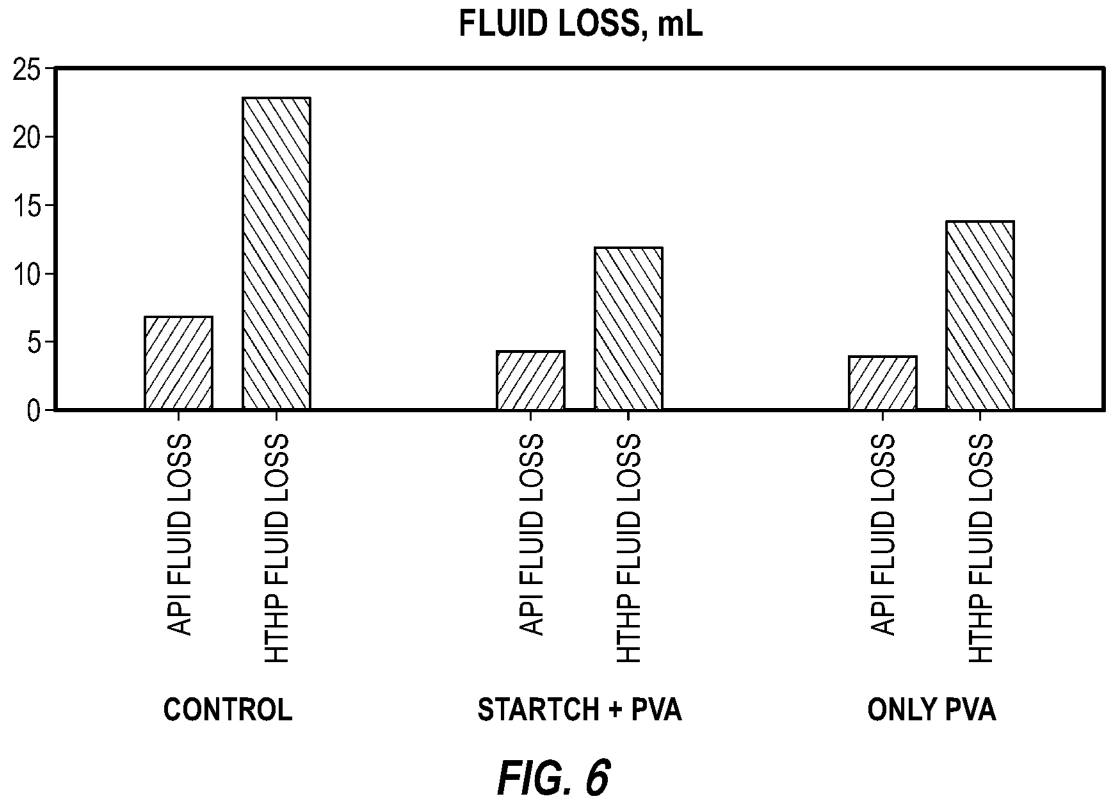
FIG. 6 is a bar graph of the results of a fluid loss test in accordance with certain embodiments of the present disclosure.

Three drilling fluid samples were prepared to 11 ppg (1318.09 kg/$m^3$) using 3 wt. % KCl using the formulation shown in table 5. The fluids were prepared with different fluid loss additives including a control fluid with a starch-based fluid loss additive only, a fluid containing branched PVA, and a fluid containing the starch-based fluid loss additive and branched PVA. The drilling fluid samples were subjected to API fluid loss tests, high temperature high pressure fluid loss at 200° F. (93° C.), shale erosion tests, and physical property tests, the results of which are shown in Table 4. It was observed that the drilling fluid samples containing branched PVA at 1 and 2 ppb concentration showed improved fluid loss over the control sample containing only the starch-based fluid loss additive. The fluids containing branched PVA also showed improved shale erosion and accretion properties. FIG. 6 is a bar graph of the results of the API fluid loss test and the high temperature high pressure fluid loss test.

TABLE 5

| |
|---|
| Fresh water |
| KCl (3 wt %) |
| Caustic Soda |
| Soda Ash |
| Xanthan |
| Starch Based Fluid Loss Additive |
| Branched PVA |
| Barite |

TABLE 6

| | Control Fluid | Starch Based Fluid Loss Additive + branched PVA | branched PVA only |
|---|---|---|---|
| Starch Based Fluid Loss Additive, ppb | 2 | 2 | 0 |
| Branched PVA, ppb | 0 | 1 | 2 |
| Xanthan, ppb | 1.7 | 1.15 | 1.7 |
| Plastic Viscosity, cP | 10 | 12 | 9 |
| Yield Point, lb/1000 ft^2 | 34 | 25 | 33 |
| API Fluid Loss, ml | 7 | 4.5 | 4 |
| HTHP fluid loss @ 200° F., ml | 23 | 12 | 14 |
| Shale Retention, % | 85.23 | 95.1 | 96.77 |
| Shale Accretion, % | 25.07 | 8.33 | 8.4 |

The disclosed drilling fluid compositions and associated methods may directly or indirectly affect any pumping systems, which representatively includes any conduits, pipelines, trucks, tubulars, and/or pipes which may be coupled to the pump and/or any pumping systems and may be used to fluidically convey the cement compositions downhole, any pumps, compressors, or motors (e.g., topside or downhole) used to drive the drilling fluid composition into motion, any valves or related joints used to regulate the pressure or flow rate of the drilling fluid composition, and any sensors (i.e., pressure, temperature, flow rate, etc.), gauges, and/or combinations thereof, and the like. The drilling fluid composition may also directly or indirectly affect any mixing hoppers and retention pits and their assorted variations.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method comprising:

combining a branched polyvinyl alcohol shale stabilizer with an aqueous base fluid to produce a water-based drilling fluid, wherein the branched polyvinyl alcohol shale stabilizer is a solid powder, and wherein the branched polyvinyl alcohol shale stabilizer is present in the water-based drilling fluid in an amount of about 0.1 pounds per barrel (ppb) (0.29 $kg/m^3$) to about 10 ppb (28.5 $kg/m^3$);

introducing the water-based drilling fluid comprising the aqueous base fluid and the branched polyvinyl alcohol shale stabilizer into a drill string;

extending a wellbore using the drill string through a subterranean formation comprising a shale; and allowing the branched polyvinyl alcohol shale stabilizer to interact with the shale to at least partially inhibit the shale.

2. The method of claim 1, wherein the aqueous base fluid comprises at least one fluid selected from the group consisting of fresh water, salt water, brine, seawater, and combinations thereof.

3. The method of claim 1, wherein the branched polyvinyl alcohol shale stabilizer comprises a hydrolyzed reaction product of a polymer network having at least one branching point formed with a monomer and a cross-linking agent that comprises at least three active functional groups.

4. The method of claim 3, wherein the monomer comprises a vinyl ester-based monomer.

5. The method of claim 4, wherein the vinyl ester-based monomer comprises at least one monomer selected from the group consisting of vinyl acetate, vinyl propionate, vinyl propionate, vinyl valerate, vinyl caprate, vinyl laurate, vinyl stearate, vinyl benzoate, vinyl pivalate, and combinations thereof.

6. The method of claim 5, wherein the polymer network further comprises a second monomer that is co-polymerized with the vinyl ester-based monomer.

7. The method of claim 6, wherein the second monomer is selected from the group consisting of an $\alpha$-olefin monomer, a methyl (meth)acrylate, a (meth)acrylic acid alkyl ester monomer, an unsaturated amide monomer, an unsaturated carboxylic acid monomer, an alkyl ester monomer of an unsaturated carboxylic acid, an unsaturated carboxylic acid anhydride, a salt of an unsaturated carboxylic acid, a glycidyl group-containing monomer, a 2-acrylamido-2-methylpropane sulfone, a sulfonic acid group-containing monomer, a phosphoric acid group-containing monomer, an alkyl vinyl ether monomer, and combinations thereof.

8. The method of claim 3, wherein the cross-linking agent comprises at least one agent selected from the group consisting of propanediol divinyl ether, triallyl ethers, triallyl phosphate, triallyl isocyanurate (TTT), pentaerythritol triacrylate, 1,1,1-trimethylolpropane triacrylate, 1,1,1-trimethylolpropane trimethacrylate, dipentaerythritol pentaacrylate, pentaerythritol tetraacrylate, triallyl cyanurate, butanediol divinyl ether, tetraallyl pentaerythritol, tetraallyl orthosilicate, N~1~,N~1~,N~2~,N~2~-Tetraallyl-N'~1~,N'~2~-bis (4-methylphenyl) ethanediimidamide, tetraallyl 1,2,3,4-cyclopentanetetracarboxylate, tetraallylsilane, tetraallyl pyromellitate, pentaerythritol tetraallyl ether, N,N,N',N'-tetraallyl-2,6-pyridinedicarboxamide, 1,2,3,5,5-Pentaallyl-1,3-cyclopentadiene, poly(allyl glycidyl ether)-b-poly(ethylene oxide)-b-poly(allyl glycidyl ether), poly(allyl glycidyl ether)-stat-poly(alkyl glycidyl ether)-block-poly(ethylene glycol)-block-poly(allyl glycidyl ether)-stat-poly(alkyl glycidyl ether).

9. The method of claim 1, wherein the branched polyvinyl alcohol shale stabilizer comprises a hydrolyzed reaction product of vinyl acetate and triallyl isocyanurate.

10. The method of claim 9, wherein a mole ratio of the triallyl isocyanurate to vinyl acetate is in a range of 0.005:100 to 10:100.

11. The method of claim 1, wherein the branched polyvinyl alcohol has a viscosity average degree of polymerization of 1,000 to 10,000.

12. The method of claim 11, wherein the branched polyvinyl alcohol has a viscosity average degree of polymerization of 2,000 to 5,000.

13. The method of claim 1, wherein the solid powder comprises particles having an average particle diameter ranging from about 0.1 microns to about 500 microns.

14. The method of claim 1, wherein the solid powder comprises particles that have a median (d50) particle size distribution of from about 2.5 microns to about 1,000 microns.

15. The method of claim 1, wherein the combining step comprises mixing a dry mix composition with the aqueous base fluid, the dry mix composition comprising the branched polyvinyl alcohol shale stabilizer and at least one additional solid additive selected from the group consisting of a fluid loss material and a lost circulation material.

16. The method of claim 1, wherein the water-based drilling fluid further comprises a weighting agent.

17. The method of claim 16, wherein the weighting agent is selected from the group consisting of barite, hematite, calcium carbonate, magnesium carbonate, iron carbonate, zinc carbonate, manganese tetraoxide, ilmenite, and any combination thereof.

18. The method of claim 1, wherein the water-based drilling fluid has a pH of about 7 to about 12.

19. The method of claim 1, wherein the aqueous base fluid is a salt water comprising at least one salt selected from the group consisting of KCl, potassium acetate, NaCl, $CaCl_2$, NaBr, $CaBr_2$, and combinations thereof.

20. The method of claim 1, wherein the water-based drilling fluid further comprises a starch-based fluid loss additive.

* * * * *